United States Patent [19]

Miskin et al.

[11] Patent Number: 5,067,592

[45] Date of Patent: Nov. 26, 1991

[54] MAST CONNECTING STRUCTURE

[75] Inventors: Stephen N. Miskin, Sandy, Utah; Kurt M. Lloyd, Pewaukee, Wis.

[73] Assignee: Harnischfeger Engineers, Inc., Brookfield, Wis.

[21] Appl. No.: 411,298

[22] Filed: Sep. 22, 1989

[51] Int. Cl.[5] .................................................. B66B 9/20
[52] U.S. Cl. ...................................... 187/9 R; 212/266; 52/296; 403/262
[58] Field of Search ..................... 187/95, 9 E, 9 R; 254/89 H, 93 R; 212/266, 271, 71, 180, 179; 403/262; 52/30, 29, 301, 296, 297, 721

[56] References Cited

U.S. PATENT DOCUMENTS

| | | | |
|---|---|---|---|
| 2,550,138 | 4/1951 | Crawford | 403/262 |
| 3,645,057 | 2/1972 | Kaplan | 52/296 |
| 4,503,935 | 3/1985 | Haffer et al. | 187/1 R |
| 4,529,066 | 7/1985 | Wieschel | 414/279 |
| 4,603,520 | 8/1986 | Deike | 52/296 |

Primary Examiner—D. Glenn Dayoan
Assistant Examiner—Kenneth Noland
Attorney, Agent, or Firm—Richard C. Ruppin

[57] ABSTRACT

A mast connecting structure is disclosed in which the mast includes a lower end having upper plate connected to the lower end of a mast, and lower plate spaced from the upper plate and connected to a base on which the mast is to be mounted. Tensioned connecting device connect the upper plate and lower plate means together to thereby mount the mast on the base. The connecting may comprise bolts having threaded ends and nuts threaded on the bolts. The bolts have an elongated length sufficient to span the thickness of the upper and lower plate means through which the volts pass plus the distance of the space between the upper and lower plate. The long bolt length increases the volume of the bolt body which results in an increased stress distribution and thereby an increased ability to withstand stress due to impact loading of the connecting structure. The mast end and mast base are preferably held apart at a spaced distance by support device such as spacer tubes positioned between the upper and lower plate and coaxially with the connecting bolts.

8 Claims, 5 Drawing Sheets

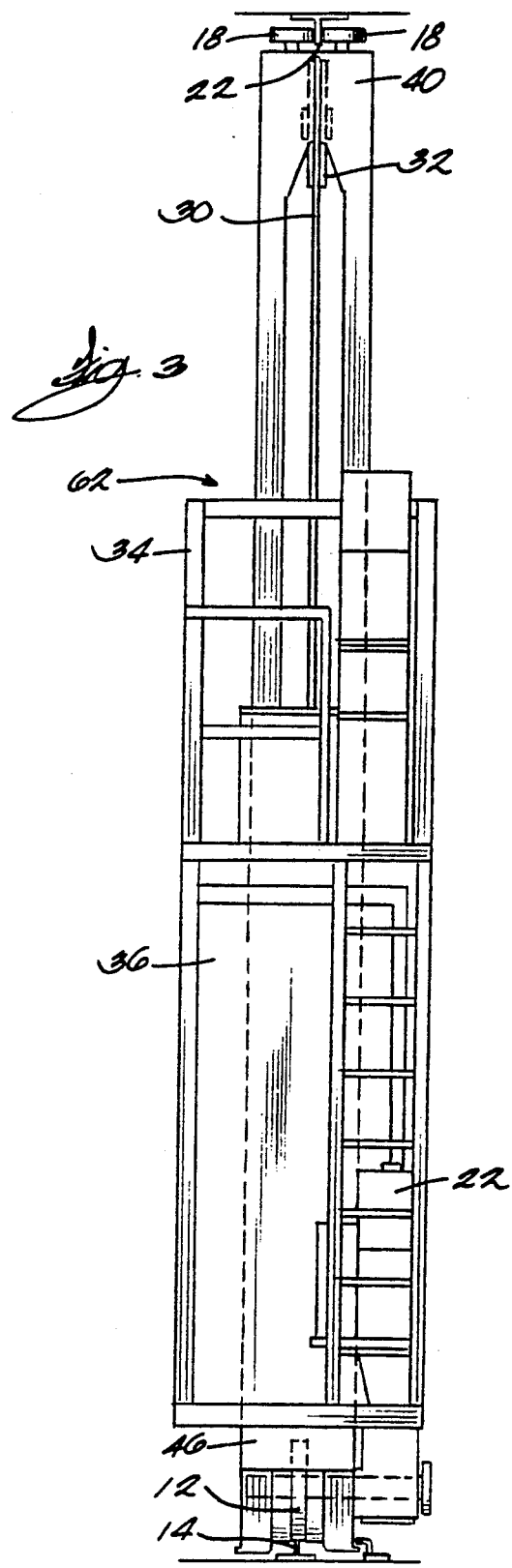

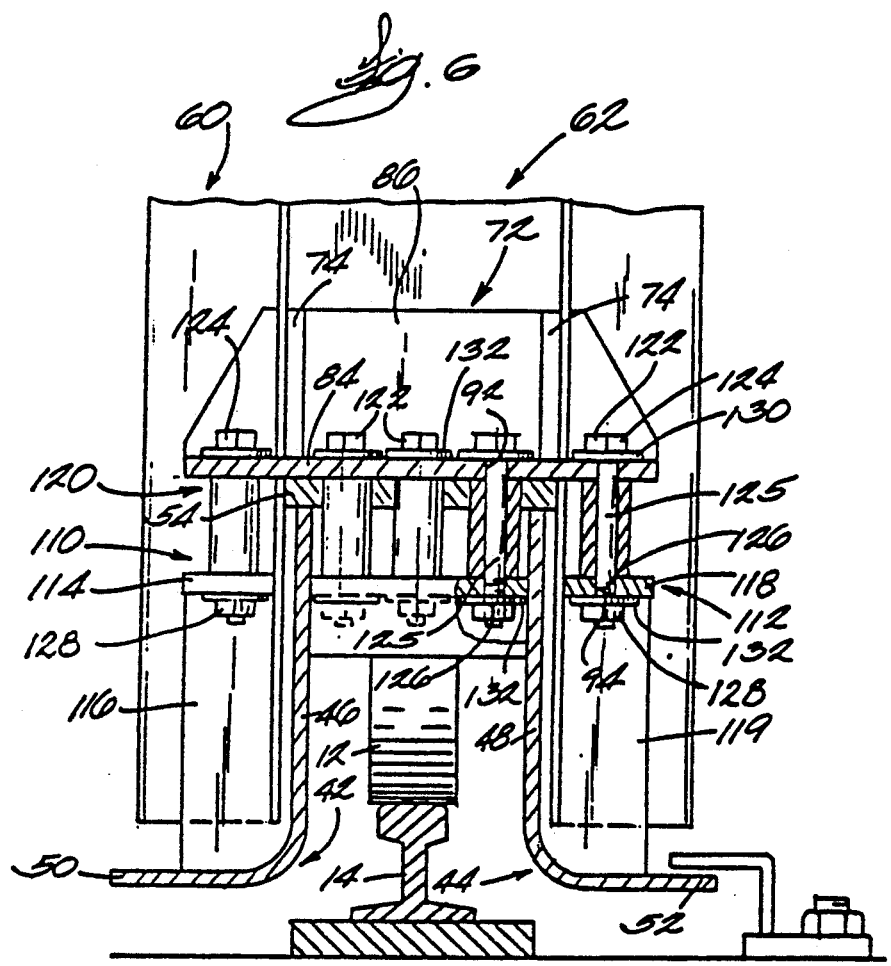

MAST CONNECTING STRUCTURE

FIELD OF THE INVENTION

This invention relates to a structure for connecting a mast to a base and, in particular, to a mast connecting structure for mounting the mast of a storage and retrieval machine on the movable base of the machine.

BACKGROUND OF THE INVENTION

In masts of storage and retrieval machines, the base connections of the mast may be subject to impact loads if the machine runs out of control or objects strike the mast. To provide a solid connection of the mast to the lower body of the storage and retrieval machine which will withstand impact loading, the bolts connecting the mast to the base are tightened to an preload tension. However, loss of a part of the tension over a period of time often occurs and the holding ability of the mast to base connections correspondingly decreases. A common cause of loss of preload tension is cyclic fatigue loading. Also, if scale, paint, burrs, or weld slag is present under the connecting bolt head or nut bearing surfaces, the projections of these materials will eventually flatten due to cold working during service. This will cause the grip length of the bolt to decrease slightly and thereby decrease the bolt preload tension.

Presently used bolted mast to base connections for storage and retrieval machines also are less capable of providing an adequate amount of preload tension, to withstand a vehicle crash having a force of one g. (that is, the force of gravity multiplied by one). With the advent of storage and retrieval machines running at higher speeds and carrying larger loads, the one g. vehicle crash specification for retaining mast connection integrity is now frequently required.

SUMMARY OF THE INVENTION

It is a general object of this invention to provide a structure for connecting a mast to a mast base which will withstand and retain the ability to withstand a high level of impact loading.

The invention is carried out by providing a mast connecting structure having upper plate means connected to the lower end of the mast, and lower plate means spaced from the upper plate means and connected to a base on which the mast is to be mounted. Tensioned connecting means connect the upper plate means and lower plate means together to thereby mount the mast on the base.

The connecting means may comprise bolts having threaded ends and nuts threaded on the bolts. The bolts have an elongated length sufficient to span the thickness of the upper and lower plate means through which the bolts pass plus the distance of the space between the upper and lower plate means. The long bolt length increases the volume of the bolt body which results in an increased stress distribution and thereby an increased ability to withstand stress due to impact loading of the connecting structure.

The mast end and mast base are preferably held apart at a spaced distance by support means such as spacer tubes positioned between the upper and lower plate means and coaxially with the connecting bolts.

The upper and lower plate means may each have members positioned outwardly of the perimeter of the mast lower end and the connecting means connects the outwardly positioned members. This results in a relatively broad connecting structure and thereby more stable support of the mast.

BRIEF DESCRIPTION OF THE DRAWINGS

Further objects and advantages will appear when taken in conjunction with the accompanying drawings, in which:

FIG. 3 is an rear end elevation view of the storage and retrieval machine shown in FIG. 1;

FIG. 6 is a cross-sectional view, partially broken away, taken along lines 6—6 of FIG. 2.

DETAILED DESCRIPTION OF THE PREFERRED EMBODIMENT

Figure 1:
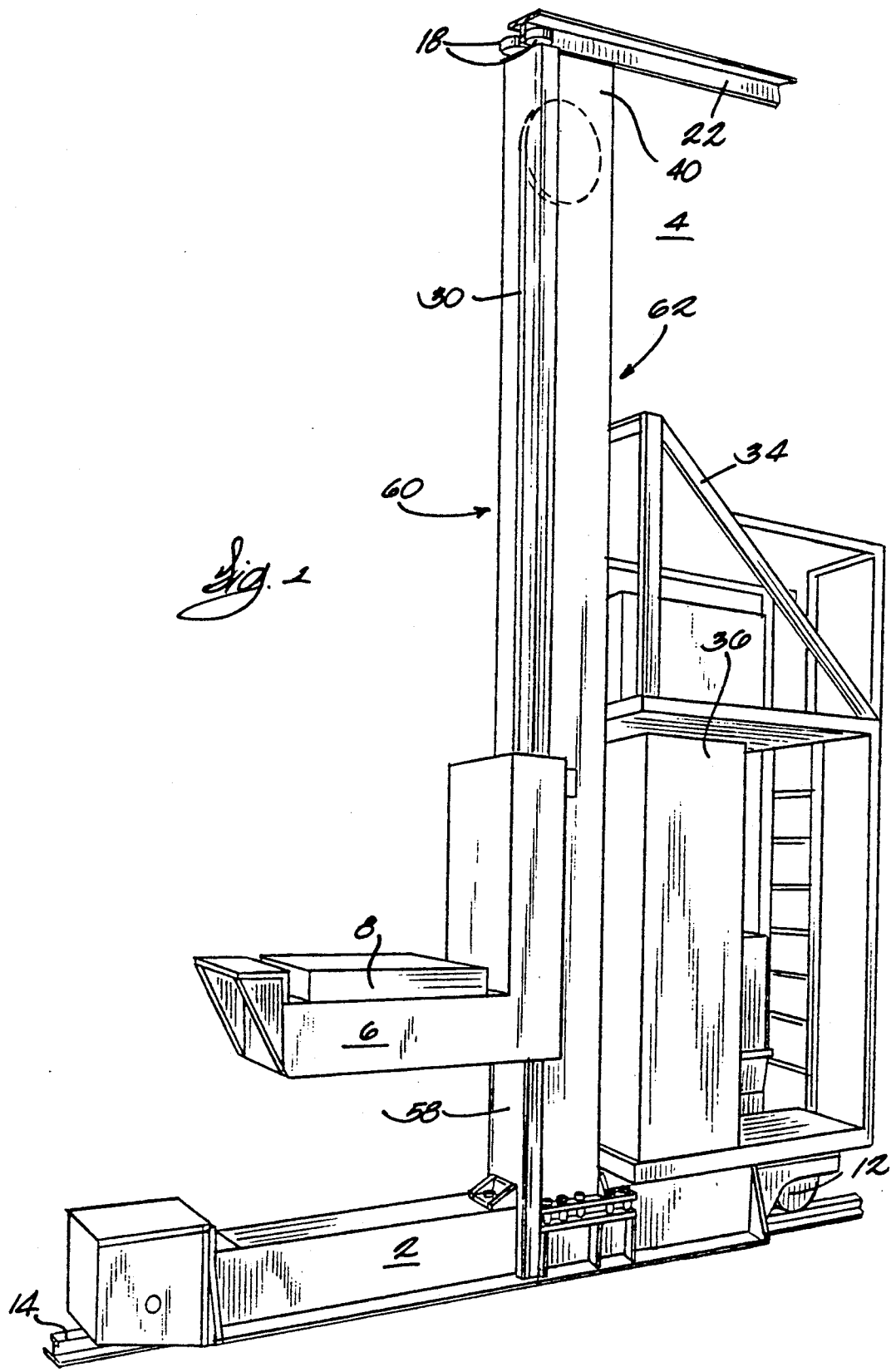
FIG. 1 is a perspective view of a storage and retrieval machine utilizing the mast connecting structure according to the invention.
Figure 2:
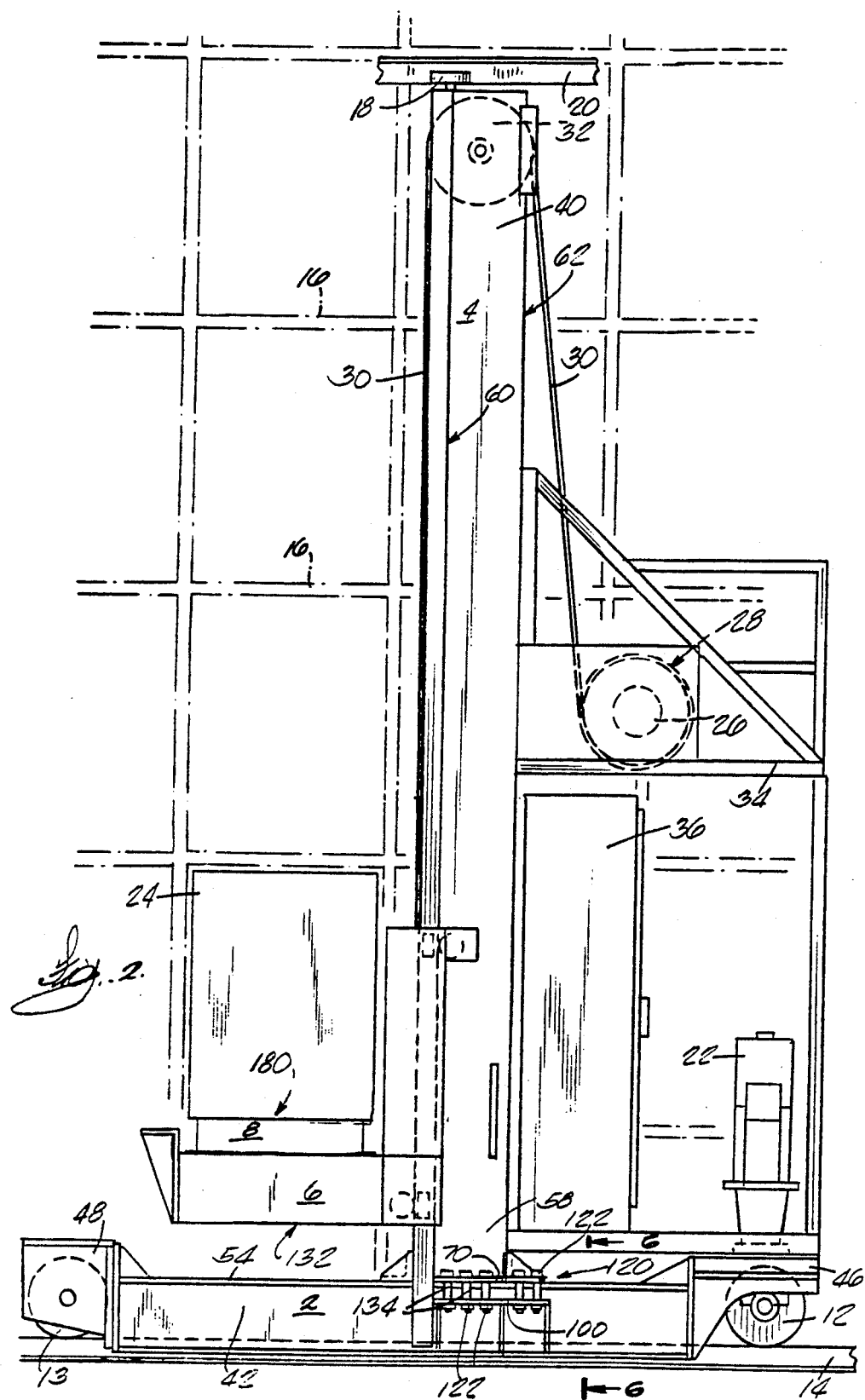
FIG. 2 is a side elevation view of the storage and retrieval machine shown in FIG. 1.
Figure 5:
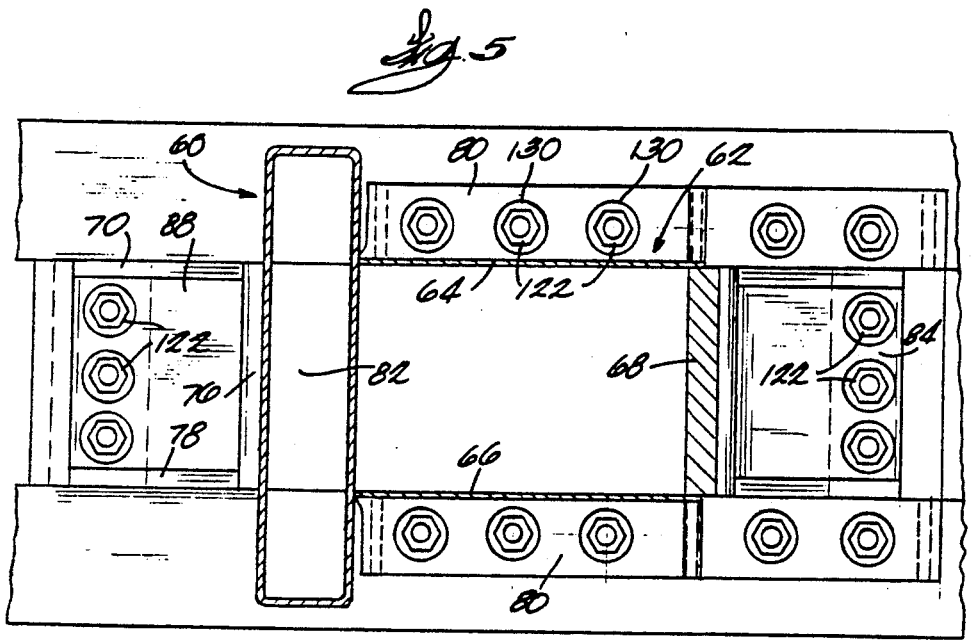
FIG. 5 is a cross-sectional plan view, partially broken away, taken along lines 5—5 of FIG. 4.
Figure 4:
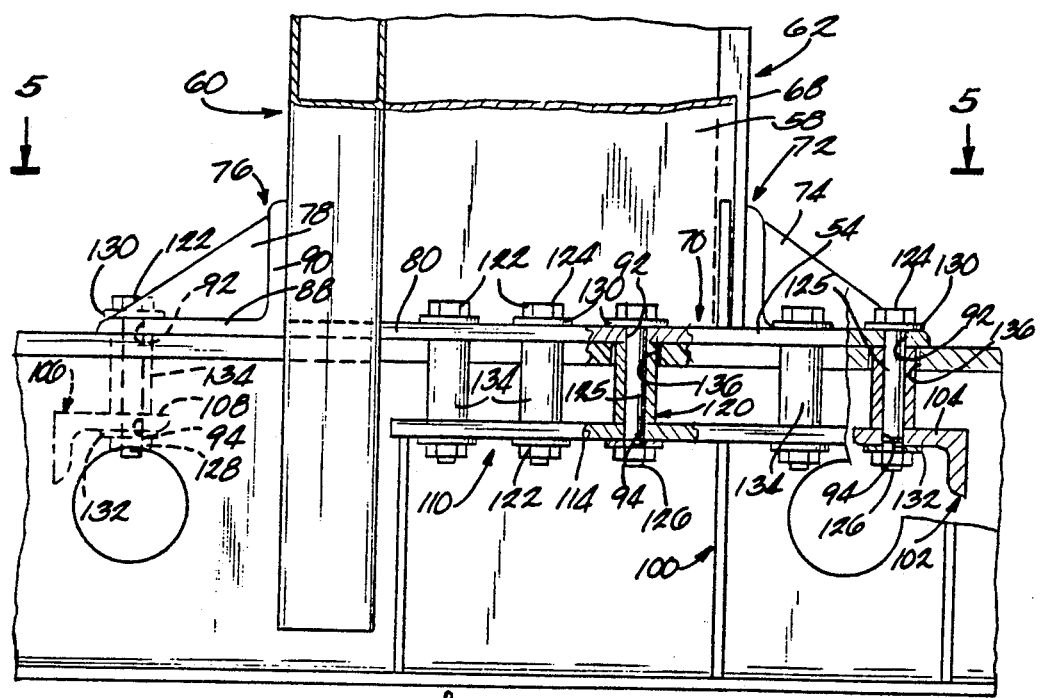
FIG. 4 is an enlarged view, partially broken away, of the mast connecting structure of the invention.

Referring generally to FIGS. 1-3 of the drawings, a storage and retrieval machine is shown having a base 2, a mast 4 mounted on and extending upwardly from the base 2, a mast connecting structure 10 for connecting the mast to the base, a carriage 6 movable along the length of the mast 4 to selected vertical positions, and a shuttle 8 mounted on the carriage 6. A front wheel 13 and a rear wheel 12 are mounted on the base 2 and roll along a rail 14 running through an aisle in a storage area such as a warehouse having stacked storage racks 16. Upper guide wheels 18 on the upper end 40 of the mast 4 engage an upper guide rail 20 to guide the storage and retrieval machine along the rail 14 and maintain the machine in an upright position. A motor 22 mounted on the lower body 2 drives the rear wheel 12 so that the storage and retrieval machine travels along the rail 14 to selected positions in the aisle adjacent to the stacked storage racks 16. At each aisle position of the storage and retrieval machine the carriage 6 is driven in vertical directions to a selected one of the storage racks 16 where the shuttle 8 is driven substantially in horizontal directions into a storage rack to deliver or retrieve an object such as box 24 shown in FIG. 2. The carriage 6 is driven by a motor 26 acting through a rope drum assembly 28, both mounted on a frame 34 affixed to the base 2 and the mast 4, and driving a rope 30 connected to the carriage and a sheave 32. A control 36 is also mounted on the mast 2 for controlling the operation and movement to selected locations of the mast 2, the carriage 6 and the shuttle 8. Suitable means (not shown) are provided for supplying electrical power to the motors mounted on the base and carriage and control signals to the control 36.

The base 2 comprises two lengthwise parallel L-shaped sections 42 and 44 respectively having upper walls 46 and 48 and lower walls 50 and 52. The base 2 further comprises a top wall 54 which extends along a substantial middle portion of the length of the base 2 and is affixed to the sections 42 and 44 by suitable means such as welding. The mast 4 comprises an elongated tube 60 having a rectangular cross section and an additional elongated member 62 affixed along its length to the tube 60 and having sides 64 and 66 and a side 68. In addition to the upper end 40, the mast 4 has a lower end 58 supported by the mast connecting structure 10 and in which the tube 60 is bifurcated and straddles the base 2.

The mast connecting structure 10 includes an upper plate means 70, a lower plate means 100, and connecting means 120 connecting the plate means 70 and 100 together. The upper plate means 70 includes an angle iron 72 affixed to the side 68 of the mast member 62 and having reinforcing gussets 74, an angle iron 76 affixed to the mast tube 60 and having reinforcing gussets 78, and a plate 80 affixed to the mast end 58. The angle iron 72, the angle iron 76, and the plate 80 are affixed respectively to the member 62, tube 60 and mast end 58 by suitable means such as welding. The angle iron 72 further includes a lower horizontal portion 84 containing bolt openings 92 and an upper vertical portion 86 and the angle iron 76 includes a lower horizontal portion 88 containing bolt openings 92 and an upper vertical portion 90. The plate 80 extends laterally of the mast 4 adjacent the sides 64 and 66 and laterally of the base 2 adjacent the top wall 54 of the base and also has bolt holes 92 in the lateral extensions. The plate 80 also has a narrow portion 82 which extends through the mast tube 60 to a position adjacent the angle 76. The horizontal portion 84 of the angle iron 72, the horizontal portion 88 of the angle iron 76 and the plate 80 all are positioned in engagement with the top wall 54 of the base 2 and together provide an anchoring section of the upper plate means 70 for the mast connecting structure 10.

The lower plate means 100 comprises an angle iron 102 spanning the space between and affixed to the upper walls 46 and 48 of the base 2 and including a horizontal portion 104, containing bolt holes 94, an angle iron 106 also spanning the space between and affixed to the upper walls 46 and 48 of the base 2 and having a horizontal portion 108 containing bolt holes 94, and connecting bars 110 and 112 respectively affixed to the outer sides of the upper walls 46 and 48 of the base 2. The angle irons 102 and 106 and the connecting bars 110 and 112 are all affixed to the lower body 2 by suitable means such as welding. The connecting bar 110 includes a horizontal member 114 containing bolt holes 94 and reinforcing gussets 116 and the connecting bar 112 includes horizontal member 118 containing bolt holes 94 and reinforcing gussets 119.

The connecting means 120 includes a plurality of elongated bolt means 122 inserted through bolt holes 92, 94 and each having a head 124, a shank 125, a threaded end 126, and a threaded nut 128 on the threaded end 126 for connecting the upper and lower plate means and thereby mounting the mast 4 on the base 2. A pair of washers 130 and 132 may be respectively positioned between the head 124 and the plate or angle iron member adjacent to the head and between the threaded nut 128 and the angle iron or bar adjacent to the nut. A plurality of support tubes, each designated by the numeral 134, are positioned coaxially on the bolt means 122 between plate 80 or a horizontal portion 84 or 88 of an angle iron 72 or 76 and the horizontal portion 104 or 108 of an angle iron 102 or 106 or a bar 110 or 112.

The bolt means 122 draws the angle irons 72, 76 and plate 80 toward the angle irons 102, 106 and bars 110, 112 upon the tightening of the nuts 128. However, the support tubes 134 extend through the openings 136 in the top wall 54 of the base 2 and hold the angle irons 72, 76 and plate 80 spaced apart from the angle irons 102, 106 and bars 110, 112 against the force of the bolt means 122 when the nuts 128 are tightened. Thus, the tightening of the nuts 128 does not move the angle irons 72, 76 or the plate 80 toward the angle irons 102, 106 or the bars 110 and 112, due to the resisting support of the tubes 134 but, instead, places a high amount of tension on the bolt means 122 which constitutes preload tensioning with respect to impact loading to which the mast 4 may be subject during operation of the storage and retrieval machine.

Elongated bolt means 122 are used which have a shank length substantially longer than bolts previously used. Bolts typically used in prior art connecting structures typically extend only through an upper plate such as the top wall 54 of the base 2 and through a lower plate immediately below the upper plate and fastened to the lower plate immediately adjacent the upper plate. The use of elongated bolt means 122 provides a greater volume of steel which, upon impact loading, results in lower stress distribution in the higher steel volume and thereby less tendency for the bolt means to fail or loosen. Providing an elongated bolt means also permits increased preload tensioning due to the greater length and higher volume of the bolt means. Further, the tension in the bolt means is distributed along a greater length of the bolt means so that if the length decreases slightly due to cold working of burrs, weld slag, paint or scale under the bolt head or nut and washers, the percentage of tension lost is smaller than in the case of an equal decrease in length in shorter bolt means.

It will be understood that the foregoing description of the present invention is for purposes of illustration only and that the method is susceptible to a number of modifications or changes, none of which entail any departure from the spirit and scope of the present invention as defined in the hereto appended claims.

What is claimed is:

1. A mast connecting structure for mounting a mast on a base, the mast including a lower end and comprising:

upper plate means affixed to the mast lower end for holding the mast on the base;

lower plate means affixed to the base and spaced apart from the upper plate means for holding the mast on the base;

connecting means comprising a plurality of bolts each extending through and spanning the upper and lower plate means and the space between the upper and lower plate means for connecting the upper plate means and the lower plate means whereby the mast is mounted on the base, the connecting means having a tensioned condition tending to deflect the upper and lower plate means toward each other; and support means positioned in the space between the upper plate means and the lower plate means and having a relatively rigid condition for preventing deflection of and holding said upper and lower plate means spaced apart against the tension of the connecting means whereby the tension applied to the connecting means is maintained.

2. The mast connecting structure according to claim 1 wherein the support means comprises a tubular spacer positioned coaxially with each bolt.

3. The mast connecting structure according to claim 1 further comprising:

a tubular spacer positioned around each bolt; and the nuts have a position on the bolts relative to the tubular spacers and the bolts are under tension as a result of the position of the nuts.

4. A mast connecting structure for mounting a mast on a base, the mast including a lower end and comprising:
  upper plate means affixed to the mast lower end for holding the mast on the base;
  lower plate means affixed to the base and spaced apart from the upper plate means for holding the mast on the base;
  the upper and lower plate means have a condition tending to deflect toward each other in response to the connecting means; and
  support means positioned in the space between the upper and lower plate means for resisting said deflection of the upper and lower plate means.

5. The mast structure according to claim 4 wherein:
  the connecting means is in a tensioned condition; and
  the support means resists deflection of the upper and lower plate means to maintain the connecting means in its tensioned condition.

6. A mast connecting structure for mounting a mast on a base, the mast including a lower end and comprising:
  lower plate means affixed to the base and spaced apart from the upper plate means for holding the mast on the base;
  connecting means in a tensioned condition for connecting the upper plate means and the lower plate means whereby the mast is mounted on the base;
  the upper and lower plate means have a condition responsive to the tensioned condition of the connecting means tending to deflect toward each other; and
  support means positioned in the space between the upper and lower plate means and having a relatively rigid condition for resisting deflection of the upper and lower plate means.

7. The mast connecting structure according to claim 6 wherein the support means resists deflection of the upper and lower plate means to maintain the connecting means in its tensioned condition.

8. A mast connecting structure for mounting a mast on a base, the mast including a lower end and comprising:
  upper plate means affixed to the mast lower end for holding the mast on the base;
  lower plate means affixed to the base and spaced apart from the upper plate means for holding the mast on the base;
  connecting means in a tensioned condition for connecting the upper plate means and the lower plate means whereby the mast is mounted on the base;
  the upper and lower plate means have a condition responsive to the tensioned condition of the connecting means tending to deflect toward each other and decrease the tensioned condition of the connecting means; and
  support means positioned in the space between the upper and lower plate mans for resisting deflection of the upper and lower plate means to maintain the connecting means in the tensioned condition.

* * * * *